(12) United States Patent  (10) Patent No.: US 6,722,676 B2
Zadok  (45) Date of Patent: Apr. 20, 2004

(54) ANTI-ROLL AUTOMOBILE SUSPENSION

(75) Inventor: Adam Zadok, 1623 S 56th Ct., Cicero, IL (US) 60804

(73) Assignee: Adam Zadok, Cicero, IL (US)

( * ) Notice: Subject to any disclaimer, the term of this patent is extended or adjusted under 35 U.S.C. 154(b) by 103 days.

(21) Appl. No.: 10/087,398

(22) Filed: Mar. 2, 2002

(65) Prior Publication Data

US 2003/0164603 A1 Sep. 4, 2003

(51) Int. Cl.[7] .............................................. B60G 21/04
(52) U.S. Cl. ....................... 280/124.106; 280/124.107; 280/5.502
(58) Field of Search .................. 280/124.106, 124.103, 280/124.107, 5.5, 5.502, 5.508, 5.509, FOR 107, FOR 133, FOR 146, FOR 148, FOR 147

(56) References Cited

U.S. PATENT DOCUMENTS

| 2,576,686 | A | * | 11/1951 | Kolbe | 280/124.103 |
|---|---|---|---|---|---|
| 2,580,558 | A | * | 1/1952 | Kolbe | 280/124.103 |
| 2,689,747 | A | | 9/1954 | Kolbe | |
| 2,978,255 | A | | 4/1961 | Rosenkrands | |
| 3,137,513 | A | | 6/1964 | Robert | |
| 3,497,233 | A | | 2/1970 | Bolaski | |
| 4,470,611 | A | | 9/1984 | Duphily | |
| 4,546,997 | A | * | 10/1985 | Smyers | 180/210 |
| 4,632,413 | A | | 12/1986 | Fujita et al. | |
| 4,854,603 | A | | 8/1989 | Scaduto | |
| 5,080,389 | A | | 1/1992 | Kawano et al. | |

FOREIGN PATENT DOCUMENTS

| BE | 753.401 | 1/1971 |
|---|---|---|
| DE | 807 755 | 7/1951 |
| DE | 1201 698 | 9/1965 |
| DE | 19704498 | 4/1998 |
| EP | 0378028 | 7/1990 |
| EP | 1070609 | 1/2001 |
| FR | 2474967 | 8/1981 |
| GB | 1122515 | 8/1968 |
| GB | 1213795 | 11/1970 |

* cited by examiner

Primary Examiner—Eric Culbreth
(74) Attorney, Agent, or Firm—Gordon & Rees LLP

(57) ABSTRACT

An anti-roll suspension for a vehicle chassis is disclosed having laterally spaced wheels, the suspension comprises an axle assembly for rotatably mounting each of a pair of laterally spaced wheels, a spring assembly and a lower control arm supporting the chassis on each of the axle assemblies, a moveable lever connected between the lower control arm and the suspension system being responsive to a lateral force on said chassis to shift the chassis laterally to the up force side of the suspension and to impose a vertical force on the down force side of the chassis so that the anti-roll linkage simultaneously lift the down force side of the chassis and lowers the up force side of the chassis.

20 Claims, 3 Drawing Sheets

ANTI-ROLL AUTOMOBILE SUSPENSION

BACKGROUND OF THE INVENTION

1. Field of the Invention

The present invention relates generally to automotive vehicle suspension systems, and pertains more particularly to an automotive suspension system that is responsive to the inertial forces on the vehicle chassis to counteract and limit vehicle body roll.

2. Discussion of the Related Art

Automotive vehicles have a body or chassis typically with an enclosed operator and passenger compartment with the body being resiliently supported by a suspension system on wheel assemblies that carry it over generally horizontal road and street surfaces. An automotive vehicle may be driven through the rear wheels, the front wheels or both. It typically has steerable front wheels and non-steerable rear wheels. The typical suspension system normally employs springs to support the body on the wheel assemblies, and with damping means in the form of hydraulic cylinders that act to dampen oscillations and movements of the body relative to the wheel assemblies and to reduce the transmission of shock from the wheels to the body.

The construction of the suspension system is often a compromise between a soft suspension for providing a soft comfortable ride for passengers over rough roads and a stiff suspension, which enhances the safety and stability of the vehicle, but is often uncomfortable for passengers. A stiffer suspension transfers more shock of the suspension to the chassis and offers less comfort to passengers but increases the stability of the vehicle. When the typical vehicle enters a turn the resulting centrifugal forces acting on the vehicle tend to roll the vehicle body about its roll center relative to the underlying suspension system. This centrifugal force also tends to displace the body laterally outwardly tending to cause the vehicle to pivot about the contact of its outer wheels with the road surface.

The construction of a vehicle body and the configuration of the vehicle suspension systems determine the location of the roll center. In a conventional vehicle, the roll center of the vehicle is typically below the center of mass or gravity of the vehicle. Centrifugal forces tending to roll the vehicle body act on a lever arm or through a lever arm determined by the vertical distance between the center of gravity and the roll center. This is known as the roll couple.

As a vehicle body moves through a turn the body tends to roll and shift the weight onto the outer wheels and springs while simultaneously unloading the inner suspension springs thereby reducing the cornering traction of the vehicle. The body also tilts or rolls toward the outside of the curve shifting the center of mass of the vehicle toward the outside of the curve. This rolling of the body about its roll center when negotiating a turn is often discomforting to operator and passengers. Stiffer suspensions which tend to reduce this tendency to roll also subjects the passengers and operator to the jolting and jarring of rough roads. A number of approaches to overcoming this tendency of the vehicle to roll during cornering have been proposed in the past. One approach has been to provide the vehicle with anti-sway bars in the form of torsion bars between the two sides of the suspension. While this approach helps reduce roll, it is not satisfactory. Another approach has been to provide the vehicle with linkage system powered by electric motors to selectively tilt the inwardly during cornering. Such a system is disclosed in U.S. Pat. No. 2,152,938. This system is also unsatisfactory for several reasons.

Other attempts at solving the cornering problems have provided for the wheels of the vehicle to tilt into a curve. These have been powered by various means such as electrical and hydraulic systems. One such system that is powered or controlled by the steering of the vehicle is disclosed in U.S. Pat. No. 2,787,473. These systems are generally complicated and expensive.

Others have attempted to overcome this problem by designing the suspension system so that the roll center of the vehicle is disposed above its center of its gravity. Most of these systems are complicated and expensive. These systems also have other serious drawbacks.

I have provided suspension systems in my prior patent applications wherein the suspension comprises an axle assembly for mounting each of a pair of laterally spaced wheels, a spring assembly supporting the chassis on each of the axle assemblies, a moveable arm connected between the spring and the chassis, and an anti-roll linkage connected between the chassis and the moveable arm of the axles of the suspension system being responsive to a lateral force on the chassis, and structured to translate lateral force on the chassis to a vertical force on the down force side of the chassis so that the anti-roll linkage simultaneously lifts the down force side of the vehicle and lowers the up force side of the vehicle. However, I have devised the present system to be less complicated than those.

Accordingly there is a need for an improved simple anti-roll suspension system that overcomes the above problems of the prior art.

SUMMARY OF THE INVENTION

The present invention solves the problem of excessive vehicle body roll. Broadly, the present invention provides a suspension system having a linkage that translates lateral body movement into a lift force on the down load side of the body.

More specifically, one embodiment of the invention comprises an anti-roll suspension for a vehicle chassis having at least two laterally spaced wheels, wherein the suspension comprises an axle assembly for rotatably mounting each of a pair of laterally spaced wheels, a spring assembly supporting the chassis on each of the axle assemblies, and anti-roll linkage comprising a pivoting link attached to a lower portion of each side of the chassis, a moveable control arm connected at an outer end to each axle assembly and at an inner end by one of said pivoting links to the chassis □ and a tie link connected between said pivoting links, said anti-roll linkage structured and configured to translate a lateral force on the chassis to a lateral counter movement of said chassis to the up force side (inside of the turn) of the suspension and a vertical upward movement of the down force side (outside of the turn)of the chassis so that the anti-roll linkage simultaneously shifts the chassis laterally to the up force side of the wheels, lifts the down force side of the chassis and lowers the up force side of the chassis to thereby counteract roll of the chassis.

BRIEF DESCRIPTION OF THE DRAWINGS

The nature, goals, and advantages of the invention will become more apparent to those skilled in the art after considering the following detailed description when read in connection with the accompanying drawing, illustrating by way of examples the principles of the invention, in which like reference numerals identify like elements throughout wherein.

Figure 1:
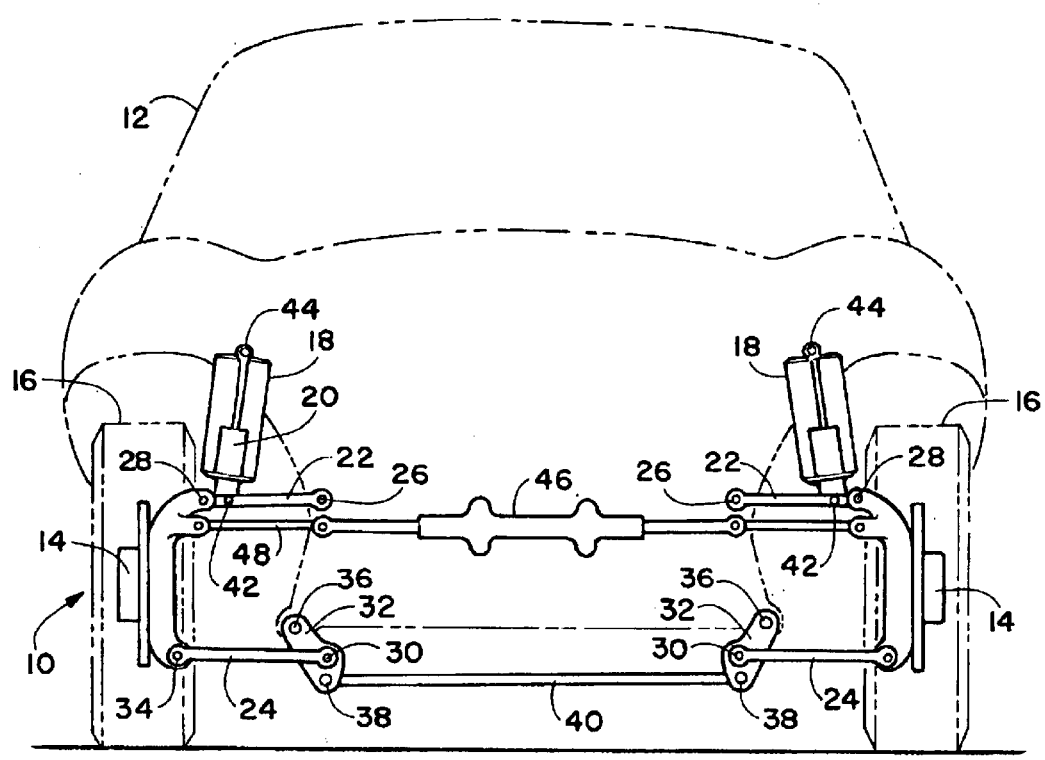
FIG. 1 is a front elevation view of a vehicle showing the front of one embodiment of the invention with the vehicle body in a static condition.

It will be recognized that some or all of the Figures are schematic representations for purposes of illustration and do not necessarily depict the actual relative sizes or locations of the elements shown. However, every effort has been made to provide a reasonable representation of geometry of the systems shown.

DETAILED DESCRIPTION OF THE PREFERRED EMBODIMENTS

In the following paragraphs, the present invention will be described in detail by way of example with reference to the attached drawings. In the description, the parts and components of the present invention, which are the same, will be referred to by the same or similar reference symbols.

Unless defined otherwise, all technical and scientific terms used herein have the same meaning as is commonly understood by one of skill in the art to which this invention belongs. In event the definition in this section is not consistent with definitions elsewhere, the definitions set forth in this section will control.

Throughout this description, the preferred embodiment and examples shown should be considered as exemplars, rather than as limitations on the present invention. As shown in the drawing for purposes of illustration, a suspension system according to the invention responds to a lateral force on the vehicle chassis such as in a turn to shift the chassis laterally to the up force side of the wheels and provides a rapid loading of the down load side springs to reduce or eliminate roll of the vehicle body. A suspension system according to the invention provides a more comfortable ride for operator and passengers by reducing or eliminating roll of the body as the vehicle negotiates turns. The suspension system of this invention is also simple and easily fabricated and installed with little or no alteration in existing vehicle design.

Referring to FIG. 1, an anti-roll suspension system in accordance with one embodiment of the invention for a front suspension of a vehicle is illustrated and designated generally by the numeral 10. The suspension system is of the independent double wishbone type system incorporating the principles of the present invention. In the independent type system, each wheel is independently connected or attached to the chassis of the vehicle. The suspension system is shown supporting the front of a typical automotive vehicle with the vehicle chassis or body 12. The present anti-roll suspension system is devised for a vehicle chassis having two laterally spaced independently sprung steerable front wheels. The front wheels may be driven, even though the drive is not shown herein. The suspension system comprises an axle assembly 14 for independently and rotatably mounting each of a pair of laterally spaced wheels 16.

The vehicle chassis 12 is supported on each of the axle assemblies by a strut which comprises a coil compression spring 18 and a hydraulic damping cylinder assembly 20. Each axle assembly is attached to the chassis by an upper control arm 22 and a lower control arm 24 which guide and allow the axle to move up and down relative to the chassis. Upper control arm 22 is pivotally attached at an inner end to the chassis at a pivot 26 and at an outer end at a pivot pin 28 to the axle assembly. Lower control arm 24 is pivotally attached at an inner end to the chassis at a pivot 30 to a lever or link 32 and at an outer end at a pivot pin 34 to the lower portion of the axle assembly 14. Lever or link 32 is pivotally attached an upper end at 36 to the chassis. A lower end of the lever 32 is connected at pivot pin 38 by a link 40 to a like lever on the opposite side of the chassis. Thus, the lower control arm has a floating connection to the chassis at the inner end. Link 40 ties the lower portions of the suspension together and allows the lower portion of the chassis to float and shift laterally as lateral forces such as centrifugal forces of a turn are applied to the chassis. The pivoting levers allow the vehicle chassis to move toward the inside of the turn and lower on the suspension.

The strut 18, 20 is directly secured at the lower end by pivot a pin 42 to lower control arm 24 near its outer end adjacent its connection to axle 14. The strut is also directly secured at the upper end by a pivot pin 44 directly to the chassis.

The opposite side of the vehicle chassis is supported on an identical suspension with all components identified by the same reference numerals. The two sides of the vehicle chassis are tied or connected together by connecting link or bar 40 that is pivotally connected at 38 to each of each levers 32 of each wheel suspension assembly. This bar or link ties compensating linkage of both sides of the suspension system together to work together in countering any tendency of the chassis to roll when cornering. In the instant system the link serves to translate a movement of the chassis and the moveable arm of the axles of the suspension system to a vertical force on the down force side of the chassis so that the anti-roll linkage simultaneously lifts the down force side of the chassis, shifts it laterally and lowers it to the up force side of the suspension.

A steering box 46 is mounted on the chassis substantially at the level of the upper control arm and connected to the two front wheel assemblies by links 48 to steer the front wheels. The steering box may be either hydraulic or rack and pinion and will have the usual connection such as a shaft or hydraulic line (not shown) from the steering wheel for operation thereof. The steering box is preferably mounted on the chassis substantially at the same level as the upper control arms. This mounts the steering box to remain and move with the chassis. This mounting position avoids the introduction of movement of the chassis relative to the wheels into the steering of the wheels.

Figure 2:
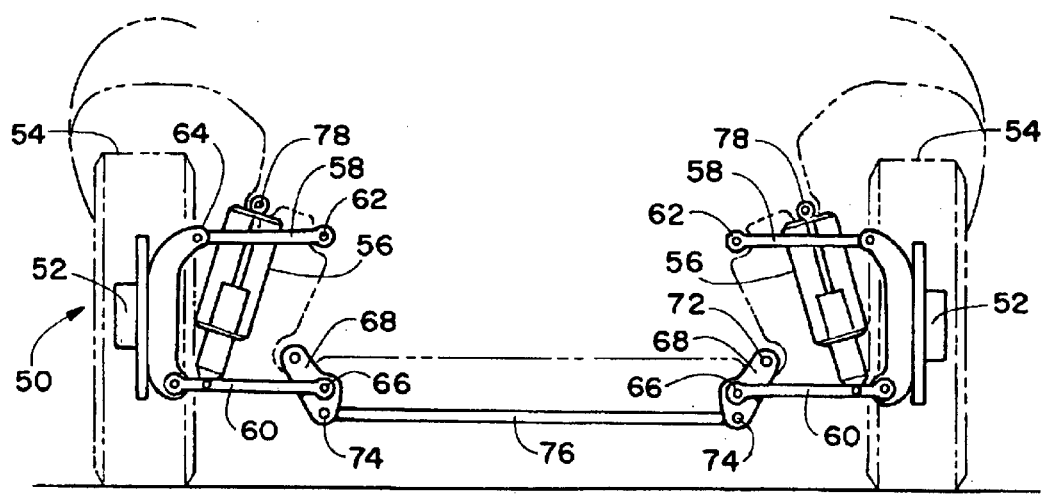
FIG. 2 is a rear elevation view of the of the vehicle of FIG. 1 embodiment of the invention showing the vehicle body in a static condition.
Figure 3:
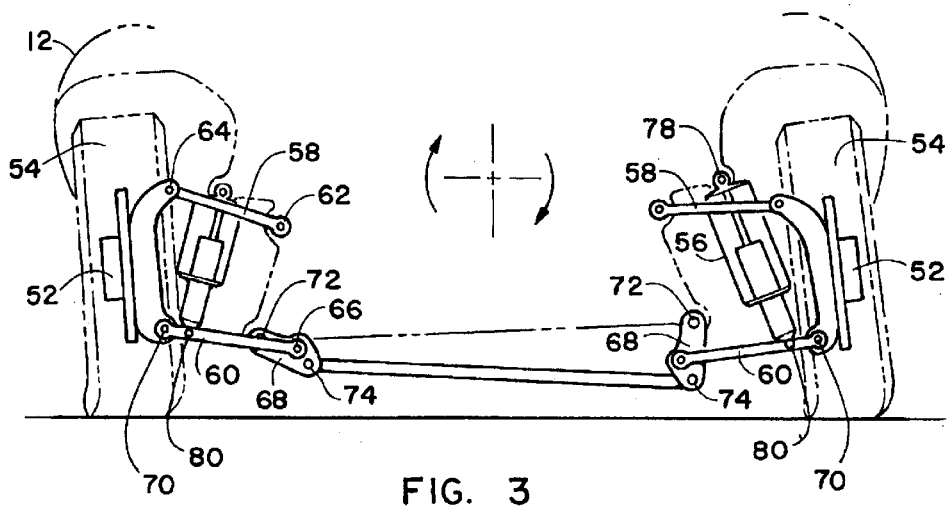
FIG. 3 is a view like FIG. 2 showing the condition of the rear suspension and chassis with the vehicle in a severe left turn.

Referring to FIGS. 2–3, a rear suspension system substantially identical to the suspension of FIG. 1 is illustrated as applied to the rear of the vehicle chassis 12. Only one side suspension will be described in detail and the same reference numerals are used to identify the same or identical components on the opposite side of the vehicle chassis. It will be seen that the major portion of the suspension system and compensating linkage system is substantially the same as in the prior described embodiment for the front. The main difference in the suspension is that the wheels in this embodiment are fixed and not steerable. Thus, the axles and the mounting thereof are different and the steering is absent. No drive train is shown to the wheels as either front or rear wheels may be driven with little or no alteration or modification in the suspension.

As seen in FIGS. 2–3, a rear elevation view illustrates an anti-roll suspension system in accordance with the previously described embodiment of the invention for a rear suspension of a vehicle designated generally by the numeral 50. The suspension system as previously discussed is of the independent double wishbone type system incorporating the principles of the present invention. The suspension system is shown supporting the rear of a typical automotive vehicle chassis or body 12. The suspension system is devised for a vehicle chassis having two laterally spaced independently sprung rear wheels. Although not shown, the rear wheels of the vehicle may be driven. The suspension system comprises an axle assembly 52 for independently and rotatably mounting each of a pair of laterally spaced wheels 54.

The rear end of the vehicle chassis 12 is supported on each of a pair of laterally spaced axle assemblies 52 by a pair of control arms and a strut assembly or unit 56 which comprises a combination coil compression spring and a hydraulic damping cylinder. Each axle assembly is attached to move relative to the chassis by an upper control arm 58 and a lower control arm 60. The control arms function to support and guide the axle and allow the axle to move up and down relative to the chassis. Upper control arm 58 is pivotally attached at an inner end to the chassis at a pivot 62 and at an outer end at a pivot pin 64 to an upper portion of the axle assembly. Lower control arm 60 is pivotally attached at an inner end to the chassis at a pivot 66 to a lever or link 68 and at an outer end at a pivot pin 70 to a lower portion of the axle assembly 52. Lever or link 68 is pivotally attached to an upper end at 72 to the chassis. A lower end of the lever 68 is connected at pivot pin 74 by a link 76 to a like lever of the suspension on the opposite side of the chassis. Thus, the lower control arm has a floating connection to the chassis at the inner end. Link 76 ties the lower portions of the suspension together and allows the lower portion of the chassis to shift as lateral forces such as centrifugal forces of a turn are applied to the chassis.

Strut 56 is directly attached at an upper end by pivot a pin 78 to the vehicle chassis. The strut is directly attached at its lower end by a pivot pin 80 directly to the lower control arm 60 near its outer end adjacent its connection to axle 52. The opposite side of the vehicle chassis is supported on an identical suspension with all components identified by the same reference numerals. The two sides of the vehicle chassis are tied or connected together by connecting link or bar 76 that is pivotally connected at 74 to each of each levers 68 of each wheel suspension assembly. This bar or link ties compensating linkage of both sides of the suspension system together to work together in countering any roll of the chassis when cornering.

In the instant system the geometry of the suspension acts to translate a movement of the chassis and the moveable arm of the suspension system to a vertical force on the down force side of the chassis so that the anti-roll linkage simultaneously lifts the down force side of the vehicle, shifts the chassis laterally and lowers it to the up force side of the suspension. The geometry of the suspension and linkage between the two sides of the suspension system is such that a lateral force of the chassis such as centrifugal force from a turn will be counteracted and resist a tendency of the chassis to roll about its roll axis.

As shown in FIG. 3 the action of this embodiment of the suspension system of the present invention as viewed from the rear in a severe left turn is illustrated. The vehicle, shown in a left turn, remains substantially level as the suspension system, as previously described, functions through the compensating suspension system and linkage to shift the chassis on the wheels to the inside of the turn and maintain the vehicle chassis level as the vehicle passes through a turn. As will be apparent when viewed from the rear of the vehicle as shown in a severe left turn the chassis will attempt to rotate clockwise about its center of rotation. This imposes a downward force on the top of right hand strut 56 which resists the down force and causes a tendency to rotate about the pin 78 at the top of strut 56.

This motion or force also imposes an upward force on the top of left hand strut 56 which resists the up force and causes a tendency to rotate about the pin 78 at the top of the left strut 56. This imposes a force to the left on both pins 72 forcing both levers 68 to rotate counterclockwise about right pin 66 which is held stationary by the respective right and left wheels 54. This rotation of lever 68 raises the right side of the body while pivoting left hand lever 68 in a counterclockwise direction lowering the left side of the chassis and shifting it slightly toward the left over the left hand wheel. The counterclockwise force on the chassis rotates left hand lever 58 in a counterclockwise direction which shifts the chassis to the left and downward. The chassis is shifted slightly to the left relative to the axles and wheels of the vehicle by this action.

The rolling movement of the vehicle chassis actuates the linkage with the movement translated by the linkage to a loading of the right hand side of the suspension and a resultant maintenance of the chassis in a level condition. The center of mass of the vehicle chassis will be above the center of the axles and in a left hand, turn as illustrated, will tend to roll clockwise about its center of rotation. The center of rotation will be below the center of mass, thus the mass of the chassis will add leverage to counteract the roll of the chassis.

Figure 4:
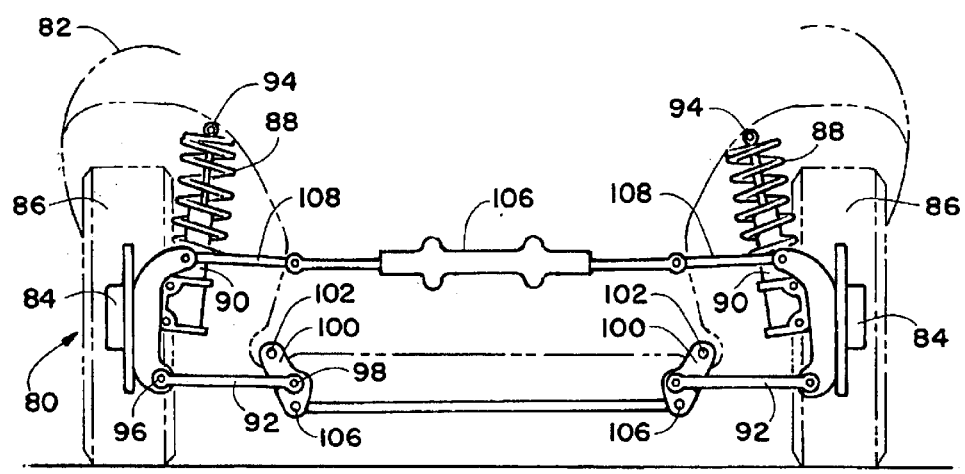
FIG. 4 is a front elevation view of a vehicle showing the front of an alternate embodiment of the invention with the vehicle body in a static condition.

Referring to FIG. 4, a front elevation view of an alternate embodiment of a suspension system similar to that of FIGS. 1–3 is illustrated and designated by the numeral 80. The suspension system is shown supporting the chassis of a typical automotive vehicle with the vehicle chassis or body 82. The anti-roll suspension system is devised for a vehicle chassis having two laterally spaced independently sprung front wheels. The wheels may be driven or not, and a drive is not shown herein. The suspension system comprises an axle assembly 84 for independently and rotatably mounting each of a pair of laterally spaced wheels 86.

The vehicle chassis 82 is supported on each of the axle assemblies by a strut assembly comprising a coil compression spring 88 and a hydraulic damping cylinder assembly 90. The axles are moveably connected to the chassis at an upper portion by the strut assembly and a lower control arm 92. This is type suspension system is typically called a McPherson strut suspension. The strut is directly attached at the lower end to the axle assembly and at the upper end to the chassis by a pivot pin 94. Lower control arm 92 is pivotally connected at an outer end by a suitable pivot pin or the like at 96 to the axle 84 and at an inner end at pivot 98 to a lever 100. Lever 100 is pivotally connected or attached at 102 directly to the chassis or body of the vehicle. This provides a floating connection of the lower control arm of the suspension to the lower portion of the chassis.

The opposite side of the suspension system is a mirror image of that described above with identical components identified by the same reference numerals. A tie bar or link 104 is pivotally connected at 106 to an outer end of a long arm or link 100 and ties the lower portion of the two sides of the suspension to float or move together. It will be noted that the levers 100 are pivotally attached at an upper end to the chassis and at the lower end to a tie link. The levers are disposed at an angle to the vertical of about 15 to about 45 degrees inward toward one another. The lower control arms are pivotally attached to the levers about midway between the ends thereof and about directly above the connection of the tie bar. The geometry may change in the roll center of the chassis due to a difference in the leverage effect of a change or difference in distance between the center of mass and the roll center. A steering box 106 is mounted on the chassis and connected by steering links 108 to arms (not shown) on the back of the strut assembly. The connection of the steering links should be vertically positioned to minimize the effect of roll or other movement of the chassis on the steering.

Figure 5:
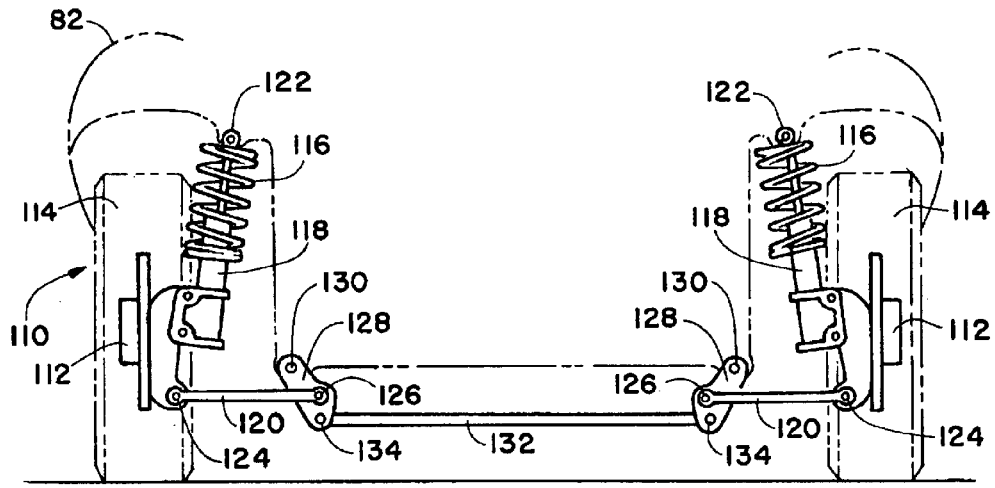
FIG. 5 is a rear elevation view of the of the vehicle of FIG. 4 embodiment of the invention showing the vehicle body in a static condition.

Turning to FIG. 5, a rear elevation view of the embodiment of the suspension system of FIG. 4 is illustrated applied to the rear of the vehicle and designated by the numeral 110. The suspension system is shown supporting the rear of the chassis or body 82 of the automotive vehicle on a pair of axles 112 on which are rotatably mounted a pair of wheels 114. As previously discussed, the anti-roll suspension system is devised for a vehicle chassis having two laterally spaced independently sprung rear wheels. The wheels are not shown as driven but, may be driven or not. The drive may be to the front or rear wheels and is not shown as it does not form a part of this invention.

The vehicle chassis 82 is supported on each of the pair of axle assemblies 112 by a strut assembly which comprises a coil compression spring 116 and a damper or shock absorber 118. The axles and wheels are moveably mounted to the chassis at the uppermost portion by the strut assembly and at the lowermost portion by a control arm 120. Strut 116, 118 is directly attached at the upper end to the chassis at a pivot pin connection 122. The strut is directly attached to the axle assembly at its lower end. Control arm 120 is pivotally connected at an outer end by a suitable pivot pin or the like at 124 to the axle 112 and at an inner end at pivot 126 to a lever 128 that is pivotally connected or attached at its upper end 130 directly to the chassis or body of the vehicle. This provides a floating connection of the lower control arm of the suspension to the lower portion of the chassis.

The opposite side of the suspension system is a mirror image of that described above with identical components identified by the same reference numerals. A tie bar or link 132 is pivotally connected at 134 to an outer or lower end of each arm or link 128 of each side and ties the lower portion of the two sides of the suspension to move together. It will be noted that the levers 128 are pivotally attached at an upper end to the chassis and at the lower end to the tie bar or link 132. The levers are mounted to be positioned at an angle to the vertical of about 15 to about 45 degrees inward toward one another when the chassis is in the static or neutral position. The lower control arms are pivotally attached to the levers about midway between the ends thereof and about directly above the connection of the tie bar and toward the center of the chassis from the connection to the chassis. The geometry may change in the roll center of the chassis due to a difference in the leverage effect of a change or difference in distance between the center of mass and the roll center.

Figure 6:
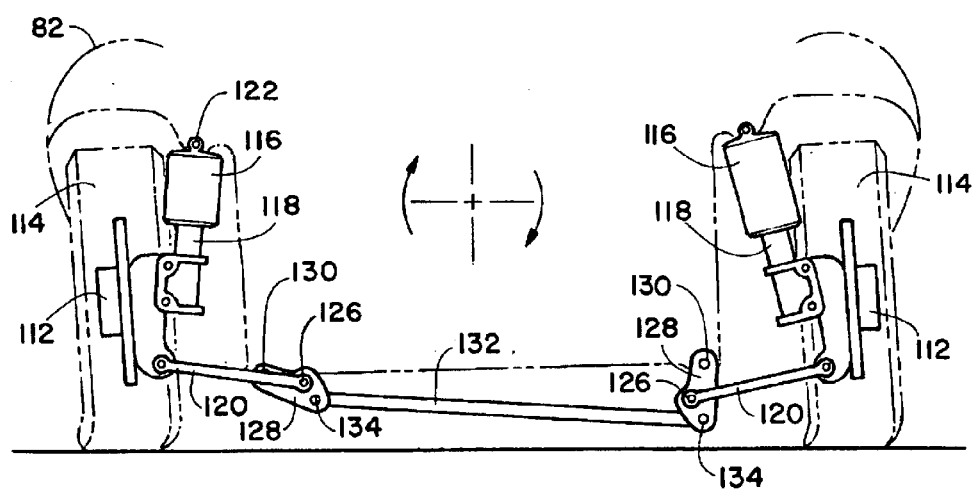
FIG. 6 is a rear elevation view of the vehicle of FIG. 4 embodiment of the invention showing the vehicle body in a severe left turn.

The operation of this embodiment of the suspension system of the present invention as viewed from the rear with the vehicle in a severe left turn is illustrated in FIG. 6. The vehicle, shown in a left turn, remains substantially level as the suspension system of this described embodiment functions in response to centrifugal force on the chassis. Centrifugal forces on the chassis act through the compensating suspension system and linkage to counteract a tendency to roll and maintains the vehicle chassis substantially level as the vehicle passes through a turn.

As will be apparent when viewed from the rear of the vehicle as shown, when in a severe left turn, the chassis will attempt to rotate clockwise about its center of rotation which will be below the center of mass of the chassis. This action of the chassis imposes a downward force on the top of right hand strut 116, 118 which resists the down force and causes a tendency to rotate about the pin 122 at the top of strut 116, 118.

This motion or force also imposes an upward force on the top of left hand strut 116, 118 which resists the up force and causes a tendency to rotate about the pin 122 at the top of the left strut 116, 118. This imposes a force to the left on both pins 130 forcing both levers 128 to rotate counterclockwise about pins 126 which is held stationary by the respective right and left wheels 114. This rotation of lever 128 raises the right side of the body while pivoting left hand lever 128 in a counterclockwise direction lowering the left side of the chassis and shifting it toward the left over the left hand wheel. The counterclockwise rotation of the chassis rotates left hand lever 128 in a counterclockwise direction which shifts the chassis to the left and downward. The chassis is shifted slightly to the left relative to the axles and wheels of the vehicle by this action of the suspension shifting the weight onto or over the inside wheel. The shifting of the chassis on the wheels or running gear of the vehicle effectively widens the track of the vehicle and reduces the prospects of rolling over in a severe turn. It also shifts the loaded wheel to a negative camber and the unloaded wheel to a positive camber. The vehicle acts in a turn as though the track is wider than it actually is because the wheel onto which the load is shifted and about which it would roll is shifted outward from the center of the chassis. This suspension gives the benefit of a wider track without the drag or resistance that a wider track provides.

The rolling movement of the vehicle chassis actuates the linkage with the movement translated by the linkage to a shifting of the chassis toward the source of the force and a loading of the springs of the right hand side of the suspension and a resultant maintenance of the chassis in a level condition. The center of mass of the vehicle body or chassis will be above the center of axles and in a left-hand turn as illustrated will tend to roll clockwise about its center of rotation. The center of rotation will be below the center of mass, thus the mass of the chassis will add leverage to counteract the roll of the chassis on the suspension.

As will be appreciated, compression springs increase in resistance with increasing displacement. Therefore, the greater displacement of the spring on one side increases the lift or support by that spring on the vehicle body. Simultaneously the extension of the spring on either side reduces the lift or support by that spring and simultaneously allows that side of the body to remain in place or drop down thus reducing the roll of the body to the other side. This results in a counteraction of the tendency of the vehicle to roll and thereby maintains the vehicle body or chassis substantially level as the vehicle goes through a turn. The response of the suspension to bumps or obstacles and depressions in the roadway is similar and maintains the vehicle body in a level condition.

While certain preferred embodiments have been described above, it is to be understood that a latitude of modification and substitution is intended in the foregoing disclosure, and that these modifications and substitutions are within the literal scope, or are equivalent to, the claims that follow.

Accordingly, it is appropriate that the following claims be construed broadly and in a manner consistent with the spirit and scope of the invention herein described.

What is claimed is:

1. An anti-roll suspension system for a vehicle chassis having at least two laterally spaced front wheels, the suspension comprising:
    an axle assembly for mounting each of a pair of laterally spaced wheels;
    a spring assembly for mounting the chassis on each of the axle assemblies;
    a pivoting link attached to a lower portion of each side of the chassis;
    a moveable control arm connected at an outer end to each axle assembly and at an inner end by one of said links to the chassis; and
    a tie link connected between said pivoting links defining an anti-roll linkage structured to translate a lateral force on the chassis during a turn to a downward and lateral counter movement of said chassis toward the up force side (inside of the turn) of the chassis and a vertical upward movement on the down force side (inside of the turn) of the chassis so that the anti-roll linkage simultaneously lifts the down force side of the chassis and lowers the up force side of the chassis to thereby counteract roll of the chassis.

2. An anti-roll suspension according to claim 1 wherein said pivoting link is connected at one end to said vehicle chassis, and said tie link is connected to the other end of said link.

3. An anti-roll suspension according to claim 2 wherein said spring assembly is a coil compression spring normally disposed in a substantially vertical orientation.

4. An anti-roll suspension according to claim 1 wherein said spring is a coil compression spring normally disposed in a substantially vertical orientation.

5. An anti-roll suspension according to claim 4 wherein each of said axle assemblies is independently supported on said chassis.

6. An anti-roll suspension according to claim 5 wherein said moveable control arm is a lower control arm connected to said pivoting link intermediate the ends of the link.

7. An anti-roll suspension according to claim 1 wherein said moveable control arm is a lower control arm connected to said pivoting link intermediate the ends of the link.

8. An anti-roll suspension according to claim 7 wherein each of said pivoting links is substantially vertically oriented when in a static condition.

9. An anti-roll suspension according to claim 8 wherein each of said spring assemblies is embodied in a double wishbone suspension.

10. An anti-roll suspension according to claim 9 wherein:
    said double wishbone suspension includes an upper control arm attached to said chassis and a lower control arm attached to said pivoting link; and
    said spring assembly is connected to said upper control arm.

11. An anti-roll suspension according to claim 8 wherein each of said spring assemblies is embodied in a McPherson strut.

12. An anti-roll suspension system for a vehicle chassis having at least two laterally spaced wheels, the suspension comprising:
    an axle assembly for mounting each of a pair of laterally spaced wheels;
    a spring assembly for mounting the chassis on each of the axle assemblies;
    a lever attached to a lower portion of each side of the chassis;
    a moveable control arm connected at an outer end to each axle assembly and at an inner end by one of said levers to the chassis; and
    a tie link connected between said levers, said anti-roll suspension system configured and structured to translate a lateral force on the chassis to a lateral counter movement of said chassis toward the up force side of the wheels and a vertical upward movement on the down force side of the chassis so that the anti-roll linkage simultaneously lifts the down force side of the chassis and lowers the up force side of the chassis to thereby counteract roll of the chassis.

13. An anti-roll suspension according to claim 12 wherein said spring assembly is a coil compression spring normally disposed in a substantially vertical orientation.

14. An anti-roll suspension according to claim 13 wherein each of said levers is connected at. one end to said vehicle chassis, and said tie link is connected to the other end of said lever.

15. An anti-roll suspension according to claim 14 wherein each of said each of said levers is substantially vertically oriented when the suspension is in a static condition.

16. An anti-roll suspension according to claim 15 wherein said moveable control arm is a lower control arm connected to said lever intermediate the ends of the lever.

17. An anti-roll suspension according to claim 14 wherein each of said spring assemblies is embodied in a McPherson strut.

18. An anti-roll suspension according to claim 17 wherein each of said spring assemblies is embodied in a double wishbone suspension.

19. An anti-roll suspension according to claim 18 wherein:
    said double wishbone suspension includes an upper control arm attached to said chassis and a lower control arm attached to said pivoting link; and
    said spring assembly is connected to said upper control arm.

20. An anti-roll suspension system for a vehicle chassis having at least two laterally spaced wheels, the suspension comprising:
    an axle assembly for mounting each of a pair of laterally spaced wheels;
    a coil compression spring assembly normally disposed in a substantially vertical orientation for mounting the chassis on each of the axle assemblies;
    a lever attached at one end to a lower portion of each side of the chassis, wherein each of said levers is substantially vertically oriented when the suspension is in a static condition;
    a moveable lower control arm connected at an outer end to each axle assembly and at an inner end to one of said levers intermediate the ends of each lever;
    a tie link connected between the outer ends of said levers, wherein said anti-roll suspension system configured and structured to translate a lateral force on the chassis to a lateral counter movement of said chassis toward the up force side of the wheels and a vertical upward movement on the down force side of the chassis so that the anti-roll linkage simultaneously lifts the down force side of the chassis and lowers the up force side of the chassis to thereby counteract roll of the chassis.

* * * * *